United States Patent [19]

Matsuda

[11] Patent Number: 5,162,989
[45] Date of Patent: Nov. 10, 1992

[54] INFORMATION RENTAL SYSTEM INCLUDING PROCESSOR EQUIPPED IC CARD HAVING DATA ERASING MEANS

[75] Inventor: Tohoru Matsuda, Tokyo, Japan

[73] Assignee: Oki Electric Industry Co., Ltd., Tokyo, Japan

[21] Appl. No.: 455,904

[22] Filed: Dec. 27, 1989

Related U.S. Application Data

[63] Continuation of Ser. No. 157,264, Feb. 18, 1988, abandoned.

[30] Foreign Application Priority Data

Feb. 20, 1987 [JP] Japan .................................. 62-35785

[51] Int. Cl.$^5$ ........................ G06F 15/44; G06F 13/00
[52] U.S. Cl. .................................... 364/401; 364/479
[58] Field of Search ................. 364/479, 401, 408; 235/379–380

[56] References Cited

U.S. PATENT DOCUMENTS

| | | | |
|---|---|---|---|
| 4,593,376 | 6/1986 | Volk | 364/479 |
| 4,597,058 | 6/1986 | Izumi | 364/479 |
| 4,683,372 | 7/1987 | Matsumoto | 235/380 |
| 4,744,062 | 5/1988 | Nakamura et al. | 371/13 |
| 4,746,787 | 5/1988 | Suto | 235/380 |
| 4,766,294 | 8/1988 | Nara et al. | 235/492 |

FOREIGN PATENT DOCUMENTS 0122040 10/1984 European Pat. Off. .

*Primary Examiner*—Gail O. Hayes
*Attorney, Agent, or Firm*—Wenderoth, Lind & Ponack

[57] ABSTRACT

An information renting system comprising an information renting apparatus and an IC card, said information renting apparatus including: source information memory means for previously storing therein rental source informations; input operating means for permitting a customer to execute a number of input operations for renting said information which he requires; IC card reader and writer means for checking a customer identification number for his genuineness by inserting said IC card into said information renting apparatus and for writing in the IC card said information required and selected by the customer through said input operating means; information reading and transferring means for reading said information required and selected by the customer and for transferring it to said IC card; means for informing said IC card of information renting time limit information and setting the same to said IC card, said IC card including: memory means for storing said rental information required by the customer and transferred to said IC card through said information reading and transferring means of said information renting apparatus; setting means for setting thereto said information time limit information; prohibition means for prohibiting the rental information stored in said memory means from being read when the renting period expires.

2 Claims, 4 Drawing Sheets

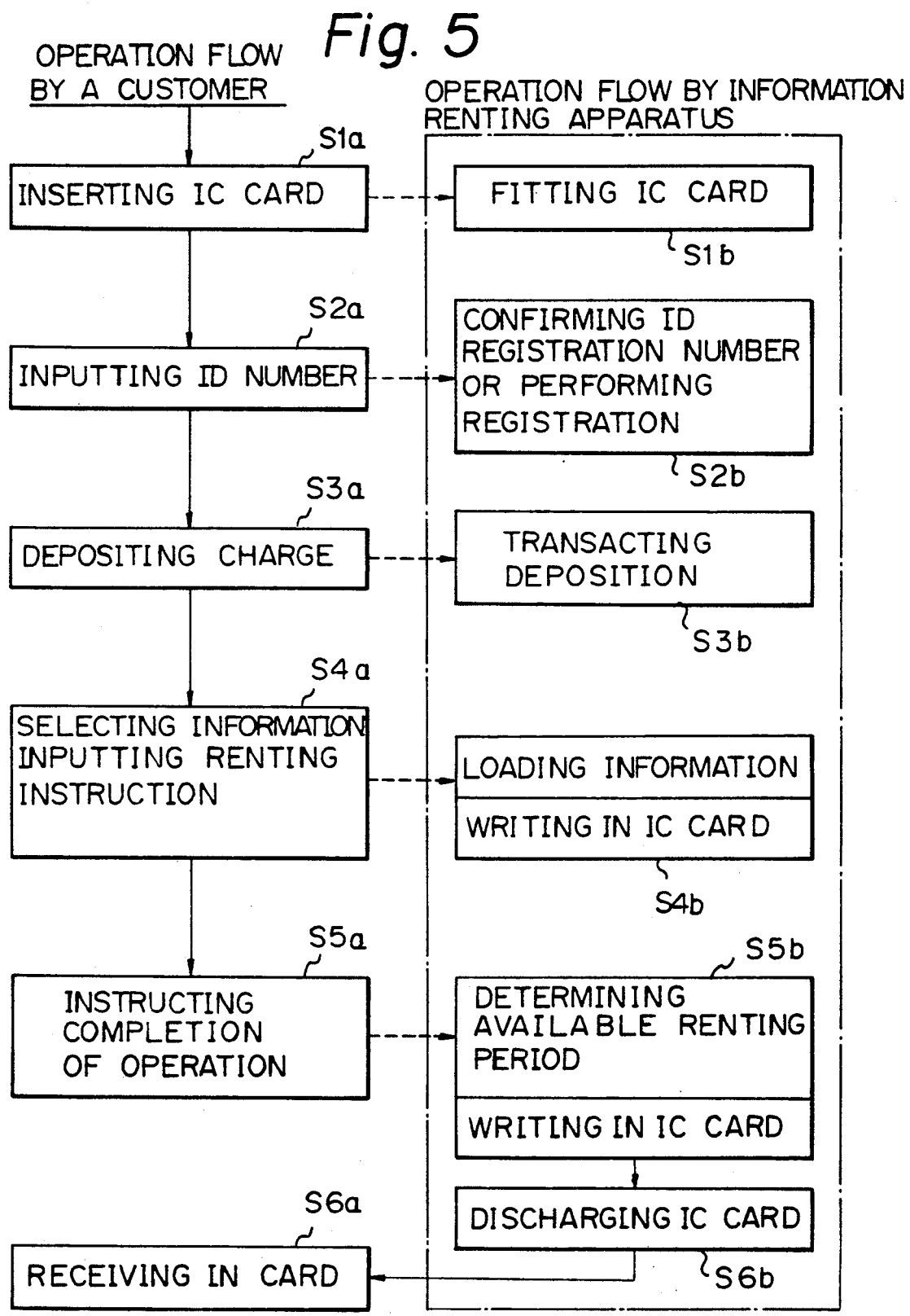

INFORMATION RENTAL SYSTEM INCLUDING PROCESSOR EQUIPPED IC CARD HAVING DATA ERASING MEANS

This application is a continuation of now abandoned application, Ser. No. 07/157,264 filed on Feb. 18, 1988.

BACKGROUND OF THE INVENTION

1. Field of the Invention

The present invention relates to an information (software) renting system for renting information on an IC card after storing various types of information such as computer programs and other data therein.

2. Description of the Prior Art

Along with the recent and rapid progress of semiconductor technology came the development of highly integrated and inexpensive products, many of which use a microprocessor. For example, data processors such as personal computers and word processors as well as various types of game machines are now available at low prices.

Additionally, a variety of programs for operating these apparatus are now commercially available. However, it is too costly for ordinary customers to purchase all of the programs they might need. There is therefore a demand for the renting of programs to be employed temporarily (e.g., for games) as well as information of other sorts).

A ROM cartridge has been employed up to now for storing such rental information, therein. The ROM cartridge is rented, for example, at a predetermined charge for one or several days.

However, such an information renting system using the ROM cartridge as described above requires a plurality of information storage media for renting a single information type when an information renting side (hereinafter referred to as an information offering side) is to rent the same information storage media to a plurality of customers. In addition, the customers of course cannot rent those media, which have already been rented.

To solve this problem, another information renting system was proposed, which was adapted to store variety of information in a private floppy disk device (hereinafter referred to as a FDD) for renting the medium to a user.

This system permits a user to borrow a FDD medium, after copying and recording a plurality of information needed by the user in the FDD medium from a source information storage media, upon payment of a predetermined charge. This system therefore enables the information to be utilized conveniently and inexpensively, compared with the ROM cartridge information renting system.

However, these prior information renting systems sufferred a drawback in that information might be utilized without permission if the customer in the return the ROM cartiridges and FDD media when the rental period expires.

SUMMARY OF THE INVENTION

In view of the aforementioned drawback of the prior art, it is an object of the present invention to provide an information renting system for renting programs and other varieties of information, in which the rented information cannot be used after a specified time limit has expired.

Another object of the present invention is to provide an information renting system wherein memory means for use in the rental information for customers makes it impossible to use the rental information stored therein after the term of the renting period expires.

The present invention utilizes an IC card, which includes therein a microprocessor for executing predetermined data processing functions in a conformity with a program previously stored in memory element to be employed as the memory means for the rental information. The IC card generally includes therein an element capable of execution of data processing in an active manner by itself, which is already well known in financial organizations such as banks as well as in retail fields. The IC card further includes a timer means to which a time limit for renting is set.

An information renting apparatus employed in the system of the present invention checks, upon renting of any information, that according to the possessor of the IC card the customer is genuine, and, if so, permits any information designated by the customer to be read from the source memory means, transferred to the IC card and written in a memory included therein. Thereupon, the information renting apparatus further transfers information concerning the time limit of the renting period to the IC card for setting the time limit to the timer means.

Furthermore, the IC card of the present invention permits, upon being informed by the timer means of the renting time limit expiring, control means composed of a microprocessor, etc. and included therein to prevent the rental information stored in the memory element from being read.

The above and other objects, features and advantages of the present invention will become more apparent from the following description when taken in conjunction with the accompanying drawings in which a preferred embodiment of the present is shown by way of illustrative example.

BRIEF DESCRIPTION OF THE DRAWINGS

FIG. 5 is a view illustrating the procedure of renting information according to the present invention.

DESCRIPTION OF THE PREFERRED EMBODIMENT

A preferred embodiment of an information renting system according to the present invention will be described in detail below.

Figure 1:
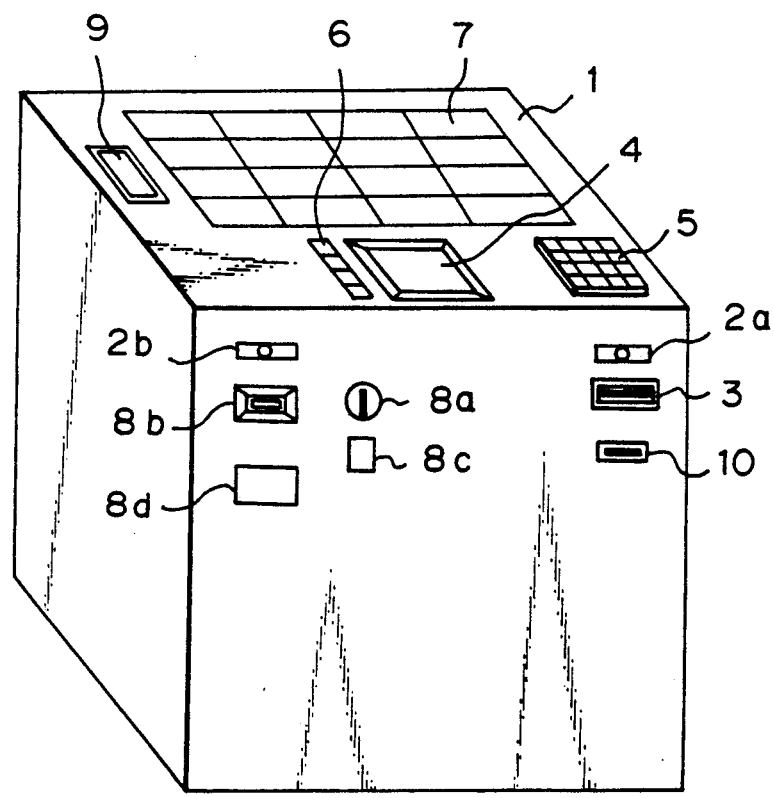
FIG. 1 is a view illustrating an external appearance of an information renting apparatus employed in the system according to the present invention.

FIG. 1 illustrates an external appearance, i.e., a casing 1, of the preferred embodiment of the present invention. The casing 1 includes on the top thereof a display screen 4 of a display unit such as a CRT display, operating buttons 5 for permitting an operator to select desired information, selection keys 6 for selecting transaction details, a guide panel 7 for indicating transaction information, and a transaction display part 9. The casing 1 further includes on the front thereof a guide lamp 2a for an IC card insertion slot, a guide lamp 2b for a cash depositer, the IC card insertion slot 3 for insertion of an IC card therethrough, a coin deposit slot 8a for deposition of any coin therethrough, a paper currency deposit slot 8b for deposition of any paper currency therethrough, a coin return slot 8c for returning any coin therethrough, a change return slot 8d for returning change therethrough, and a receipt discharge slot 10 for discharging a receipt therethrough.

Figure 2:
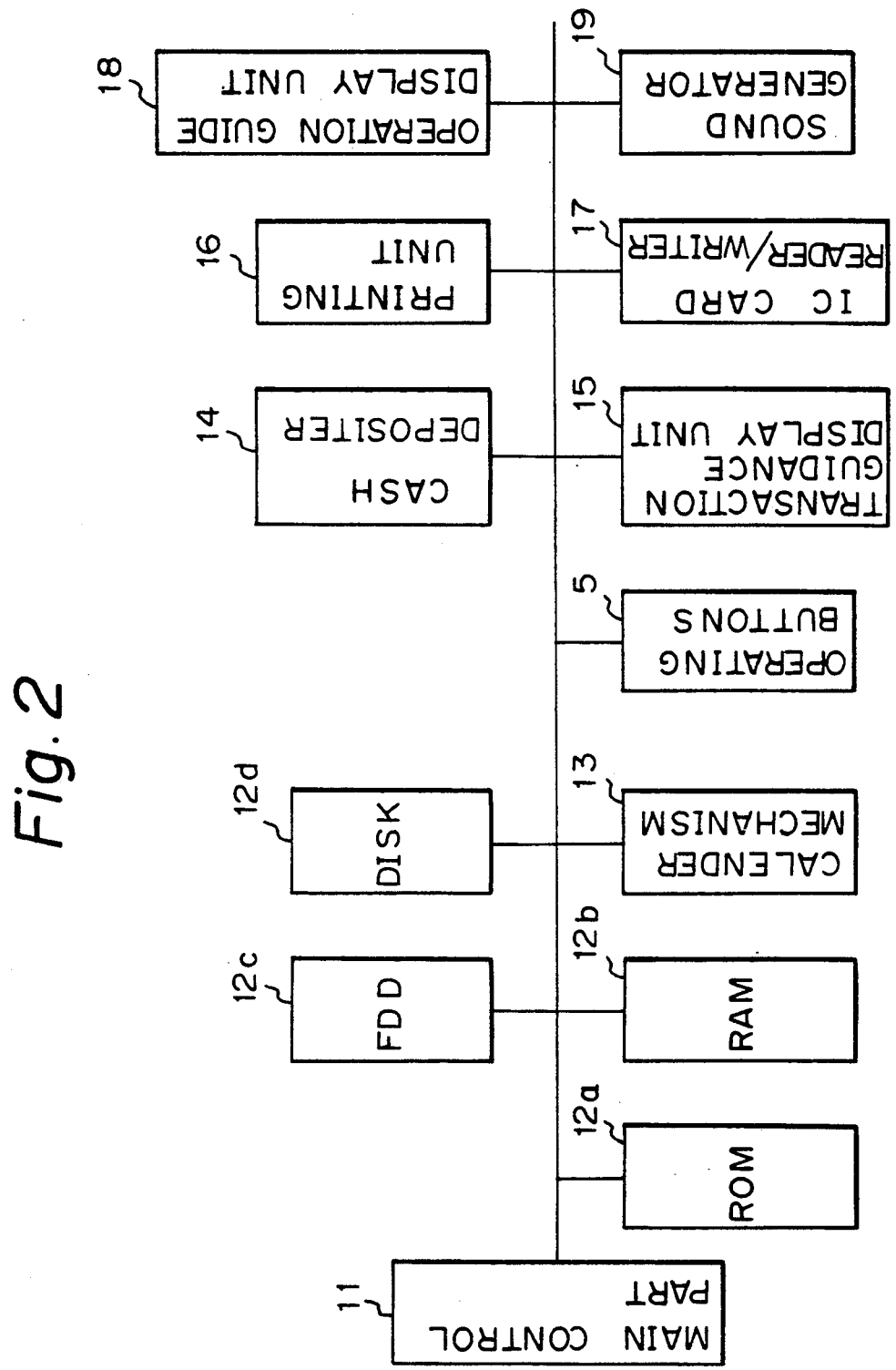
FIG. 2 is a block diagram illustrating the internal arrangement of the information renting apparatus in FIG. 1.

FIG. 2 illustrates the internal arrangement of the preferred embodiment of the present invention. In this arrangement, a main control part 11 is composed, in general, of a microprocessor and controls all of the components of the information renting apparatus. The apparatus includes two memories, a RAM 12b and a ROM 12a. The RAM 12b stores programs for processing various business and working data, and the ROM 12a stores parts of programs such as IPLs, etc. The apparatus further includes a floppy disk device 12c (hereinafter referred to as a FDD) and a magnetic disk device 12d (hereinafter referred to as a DISK). The FDD 12c records various business programs with which the RAM 12b is loaded as needed for execution of business transactions as well as for execution of any update and maintenance of the information recorded on the DISK 12d. The DISK 12d stores information packages of all types to be rented to customers and is employed a source memory means for the rental information, and is capable of storing business programs, etc., if necessary. The apparatus furthermore includes a calender mechanism 13 having a clock function for informing an operator of the date of the transactions, a cash depositer 14 for controlling the receipt of the cash and the change, a transaction guidance display unit 15 for displaying guidance instructions on the display screen 4, and a printing unit 16 for printing receipts. The apparatus further includes an IC card reader/writer 17 for confirming the customer identification (ID) when the IC card is inserted thereinto by writing in the IC card information selected by the operating buttons 5, an operation guide display unit 18 for operating the guide lamps 2a and 2b, and a sound generator 19 for effecting various/guidance instructions by generating sounds at needed.

Figure 3:
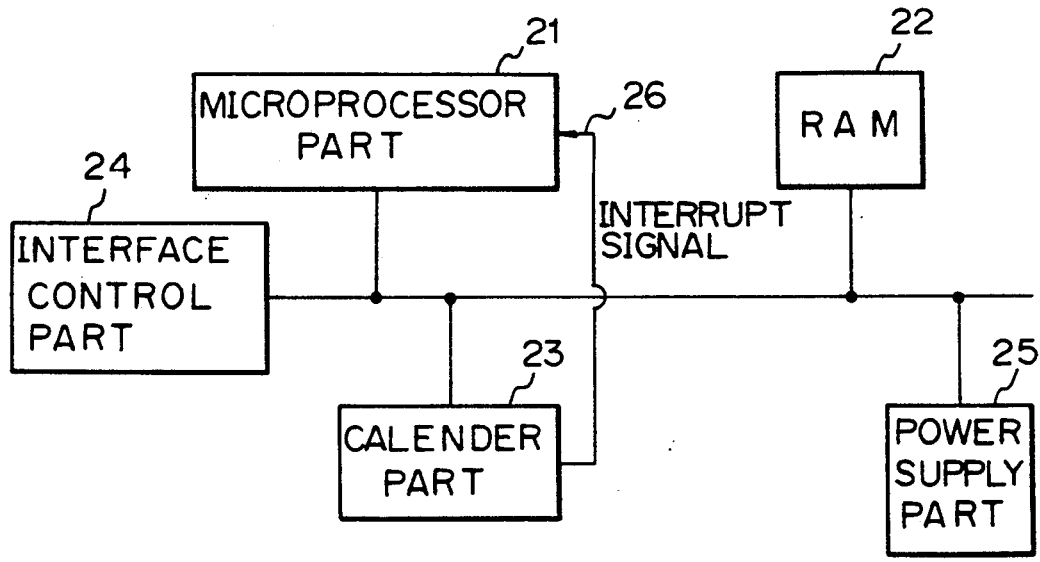
FIG. 3 is a block diagram illustrating the internal arrangement of an IC card for use in the present invention.

FIG. 3 is a block diagram illustrating the arrangement of the IC card suitable for use in the information renting apparatus of the present embodiment. The IC card includes a microprocessor part 21 composed of a microprocessor and a fixed memory unit for storing therein a variety of processing programs, a RAM 22 for storing customer ID numbers, an index of the stored information, and a variety of other information, a calender part 23 (the aforementioned timer means) that starts a clock operation the moment the available period (renting period), during which information is usable, is registered, and that issues an interrupt signal to the microprocessor part 21 when that period expires, an interface control part 24 for writing and reading information into and from the IC card from an external apparatus (i.e., the information renting apparatus), a power supply part (battery) 25, and a signal line 26 for sending an interrupt signal from the calendar part 23 to the microprocessor part 21.

The calendar part 23 includes a reference signal generator part such as a crystal oscillator for generating a reference signal for a period of 1 second, for example, a counting part for counting days, hours, minutes, years and weeks as needed, and an interrupt signal generator part for comparing the present time with the time previously set in an alarm setting part and issuing, when both are coincident, an alarm signal to an external microprocessor which executes interrupt operation in response to the alarm signal. The calendar part 23 further includes an alarm time setting part for permitting the external apparatus (i.e., information renting apparatus) to set the time period at which an alarm signal will be generated.

Figure 4:
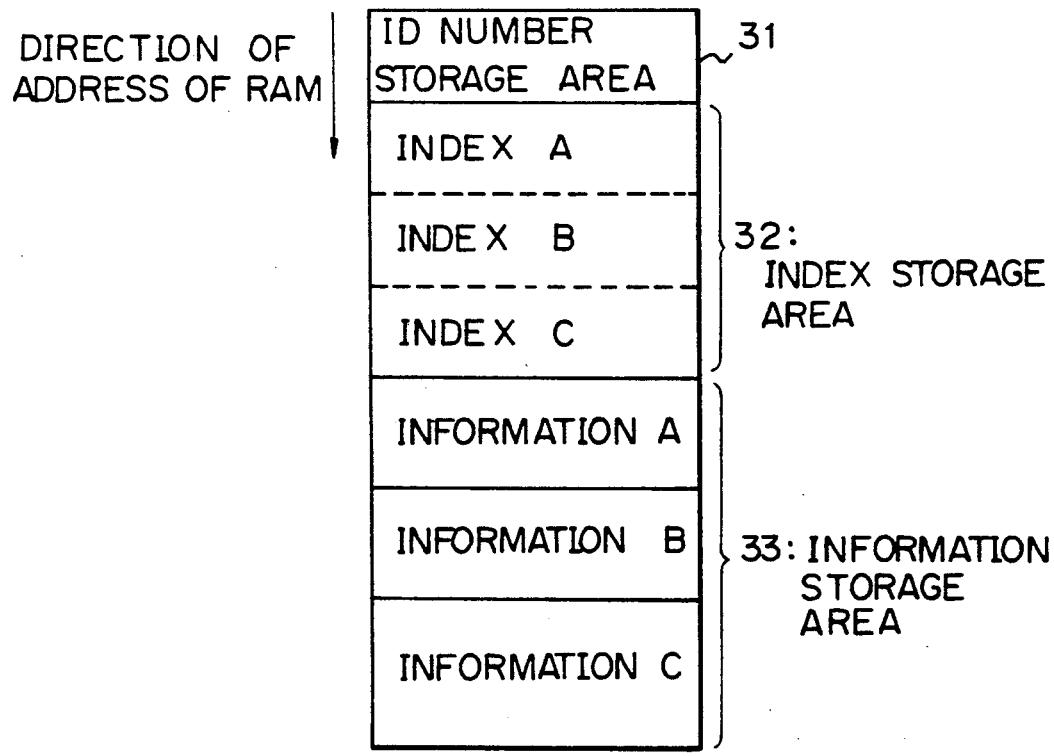
FIG. 4 is a view illustrating the arrangement of information stored in memory means disposed in the IC card for use in the present invention.

FIG. 4 illustrates an example of an arrangement of the information stored in the RAM 22 included in the IC card. The arrangement includes a customer ID number storage area 31, an index storage information areas 32 and an information storage area 33 for storing other information. The index storage area 32 includes designations of the stored information and the addresses of the information. The information storage area 33 stores various types of information, three types in the figure as an example, in conformity with the indexes.

In the following, the operation of the information renting apparatus of the present preferred embodiment will be described with reference to the flowchart shown in FIG. 5. Hereupon, the left half of the same figure illustrates the operating steps of the customer, while the right half illustrates the operating steps of the apparatus. A customer who wants to utilize the present apparatus is supplied, after registration at a dealer, with an IC card fitted to the present apparatus. The customer inserts the IC card into the IC card insertion slot 3 the apparatus in Steps of S1a, S1b, and executes predetermined procedures such as inputting an ID number using the operating buttons 5 according to the guidance instructions of the transaction guidance display unit 15 for registering as a member of the present apparatus in Steps of S2a, S2b. The inputted ID number of the customer is stored in the FDD 12c or the DISK 12d, and simultaneously stored in the RAM 22 of the IC card (ID number storage area 31). When the IC card is used thereafter to rent information from the DISK 12d of the information renting apparatus, the coincidence between the ID numbers stored in the RAM 22 and inputted by the customer must be checked. When those two numbers are not coincident, the information renting apparatus only executes only an operation to return the IC card. When the two numbers are coincident, the customer deposits a charge specified by the kind of the information and the renting period in the coin deposit slot 8a in accordance with the guidance instructions displayed on the transaction guidance display unit 15, and selects the desired information using the operating buttons 5. Hereby, the RAM 12b is loaded with the information selected from the DISK 12d, and the selected information is further written in the RAM 22 (index area 32 and information storage 33) of the IC card by the IC card read/writer 17 together with the index of the information in Steps S3a, S4a, S3b, S4b.

A variety of information in accordance with charges can be written in the IC card in such a manner. And, when all information needed is recorded, the main control part 11 determines the available period on the basis of the amount of rental information, the kinds thereof, and the charges, and registers (sets) the determines available rental period in the calendar part 23 of the IC card through the IC card reader/writer 17 in Steps of S5a, S5b. Thereafter, the IC card is discharged from the IC card insertion slot 3 to complete the renting operation of the associated information in steps S6b, S6a.

The customer stores a variety of information in the IC card by making use of the information renting apparatus as described above. And, the customer can read wanted information from the IC card by connecting the IC card with a data processor fitted to the IC card after completing the recording. The data processor refers to the index area 32 of the IC card to determine the address of needed and recorded information to thereby successively reading data stored in that area. Additionally, the data processor erases, when the microprocessor 21 of the IC card receives an interrupt signal (through the signal line 26) indicative of the expiration of the available rental period from the calendar part 23, information recorded in the RAM 22 except for the user's ID number.

The associated information is erased immediately after the available period expires, as described above. Accordingly, the use of the associated information can be prevented from being utilized without permission after the available rental period expires. Once the associated information is erased, the information is still available any number of times by again inserting the IC card in the information renting apparatus for effecting the renting operation upon depositing a required charge. When any information is more than once, the information renting apparatus judges whether a customer is genuine or not, by comparing the ID number stored in the IC card with an ID number inputted by the customer. In addition, when the IC card is inserted into the information renting apparatus before the rented information is due, the information renting apparatus executes an operation returning the rented information. The return operation is effected by transferring the available rental period data stored in the IC card to the information renting apparatus, comparing the data so transferred with the present date held in the calendar means provided in the information renting apparatus, and erasing, unless the rented information is due, the rental information stored in the RAM 22 provided in the IC card. The information erasing operation thereupon is effected by permitting the information renting apparatus to issue an erasing instruction to the IC card via the IC card reader/writer 17, and the microprocessor part 21 of the IC card to receive the instruction via the interface control part 24 for executing the erasing operation of the associated operation stored in the RAM 22 by itself.

Here, although in the above embodiment the IC card prohibited the rental information stored in the RAM 22 from being read externally, other means or methods may be employed. For example, the microprocessor part 21, after receiving an interrupt signal indicating the expiration of the available rental period from the calendar part 23, may prohibit any access to the rental information storage area in the RAM 22 from being taken.

Although a certain preferred embodiment has been shown and described, it should be understood that many changes and modifications may be made therein without departing from the scope of the appended claims.

What is claimed is:

1. An information renting system for renting programs and other types of information, said information renting system comprising:
    an information renting apparatus for storing and renting the programs and other types of information to be rented; and
    an IC card for storing therein selected information copied from said information renting apparatus when said IC card has been inserted into said information renting apparatus;
    wherein said information renting apparatus comprises:
    a source information memory having stored therein said programs and other types of information;
    an input operating means for inputting operating instructions, said operating instructions including a selection of said selected information to be copied from said information renting apparatus;
    an IC card read/write means for reading an identification number stored in said IC card and for writing said selected information into said IC card;
    an information reading and transferring means for reading said selected information from said source information memory and for transferring the thus read selected information to said IC card read/write means;
    a comparing means for comparing an identification number inputted by said input operating means with an identification number stored in said IC card, wherein said selection of said selected information is enabled when the inputted identification number and the stored identification number are the same; and
    a deposited cash treating means for enabling said selection of said selected information and for determining said rental term expiration period according to an amount of cash deposited;
    wherein said IC card comprises:
    a memory means for storing said selected information and said identification number;
    an electronic calendar;
    a processor means for controlling said memory means;
    an interface means for receiving said selected information from said IC card read/write means and connected to said memory means, said electronic calendar, and said processor means;
    wherein said electronic calendar includes means for setting a rental term expiration period, and for sending an expiration signal to said processor at the termination of said rental term expiration period, and wherein said processor means includes means for erasing said selected information stored in said IC card upon receiving said expiration signal.

2. An information renting system as recited in claim 1, wherein said processor means further includes means for reading said selected information stored in said memory means until the termination of said rental term expiration period, and wherein said processor means erases only said selected information stored in said memory means at the termination of said rental term expiration period.

* * * * *